United States Patent [19]

Miers

[11] Patent Number: 5,531,887
[45] Date of Patent: Jul. 2, 1996

[54] MANUALLY OPERATED REVERSE OSMOSIS DESALINIZATION SYSTEM

[75] Inventor: Gary L. Miers, Poland Springs, Me.

[73] Assignee: Howell Laboratories, Inc., Bridgton, Me.

[21] Appl. No.: 449,080

[22] Filed: May 24, 1995

[51] Int. Cl.$^6$ .................. B01D 21/30; B01D 24/00
[52] U.S. Cl. ............... 210/135; 210/134; 210/136; 210/87; 210/91; 210/321.6; 210/416.1; 210/433.1; 417/374; 417/541
[58] Field of Search .................. 210/652, 195.2, 210/650, 257.2, 90, 87, 134, 135, 136, 416.1, 433.1, 321.6, 91; 417/374, 541

[56] References Cited

U.S. PATENT DOCUMENTS

| | | | |
|---|---|---|---|
| Re. 32,144 | 5/1986 | Keefer | 210/652 |
| 3,558,242 | 1/1971 | Jenkyn-Thomas | 417/374 |
| 4,187,173 | 2/1980 | Keefer | 210/652 |
| 4,230,564 | 10/1980 | Keefer | 210/652 |
| 4,288,326 | 9/1981 | Keefer | 210/652 |
| 4,406,748 | 9/1983 | Hoffman | 203/10 |
| 4,432,876 | 2/1984 | Keefer | 210/652 |
| 4,434,056 | 2/1984 | Keefer | 210/652 |
| 4,534,713 | 8/1985 | Wanner | 210/416.3 |
| 4,676,905 | 6/1987 | Nagao et al. | 210/416.1 |
| 5,254,257 | 10/1993 | Brigano et al. | 210/652 |

*Primary Examiner*—Ana Fortuna
*Attorney, Agent, or Firm*—Samuels, Gauthier, Stevens & Reppert

[57] ABSTRACT

Reverse osmosis, particularly for manually operating water desalination, is achieved using semipermeable membranes which selectively permeate purified water from a feed solution pressurized by reciprocating piston or diaphragm pump. The manual pump action is assisted by using two pump pistons to provide a continuous flow of feed solution to the concentrate side of the membrane to continuously flush the membrane surface. The concentration polarization is controlled by exhausting the high pressure concentrate to atmosphere through an orifice and relief valve.

3 Claims, 1 Drawing Sheet

5,531,887

MANUALLY OPERATED REVERSE OSMOSIS DESALINIZATION SYSTEM

FIELD OF THE INVENTION

The invention relates generally to manually operated reverse osmosis and ultrafiltration fluid separation processes and methods, and is applicable particularly to water desalination and purification by reverse osmosis.

BACKGROUND OF THE INVENTION

Desalination by reverse osmosis is achieved by pumping a feed stream of saline water at an elevated working pressure into a pressure resistant vessel containing semipermeable membranes. Purified product water of greatly reduced salinity permeates across the membranes into low pressure collection channels if the working pressure exceeds the feed stream osmotic pressure. Excess working pressure above the feed stream osmotic pressure is required to produce sufficient product water flux across membranes of reasonable surface area, and also to ensure sufficient dilution of the small but finite salt diffusion through the membrane which always exists where there is a concentration gradient across such membranes.

While some of the feed stream permeates through the membranes, the balance becomes increasingly concentrated with salt rejected by the membranes. In a continuous reverse osmosis process, a concentrate stream must be exhausted from the vessel to prevent excessive salt accumulation. In commonly available manually operated reverse osmosis apparatus the concentrate stream is directed to the back side of the single pump piston through a combination of directional valves and mechanical dwell and the energy due to pressurization is used to assist the operator in pumping. Furthermore, the pressurized concentrate is then exhausted to ambient, thus controlling concentration polarization.

Concentration polarization in the feed stream is the tendency for a concentration gradient to develop in the feed stream with high salt concentration on the membrane face during reverse osmosis. This tendency results from the bulk transport of saline water toward the membrane face and the accumulation of salt in the boundary layer as less saline water permeates through the membrane, balanced by diffusion of salt back out of the boundary layer. Concentration polarization is detrimental especially with feed streams of high osmotic pressure such as sea water, because the membrane sees a higher concentration which raises the effective osmotic pressure. When concentration polarization occurs, working pressure for given product flux must be increased, product salinity will be increased and membrane life may be impaired.

Manually operated reverse osmosis systems are typically designed to reduce concentration polarization effects by forced convection through the membrane array. Forced convection may be provided by circulating a low ratio of the permeate stream through suitably configured feed channels between membrane faces. However, it is generally not desirable to bypass a portion of the permeate stream to reduce concentration polarization.

It is desirable to provide a continuous feed stream circulation through the membrane array, because even momentary stagnation of flow may cause severe concentration polarization.

Operation at low ratios of permeate flow to concentrate flow is also generally favorable to the reduction of concentration polarization effects.

SUMMARY OF THE INVENTION

The invention achieves reverse osmosis with low energy consumption without bringing a pressurized concentrate stream to the backside of a pump piston. Thus intricate valving and mechanical dwell are eliminated. Concentration polarization effects are reduced by maintaining the continuity of feed stream flow circulating past the membranes and by enabling operation at a low ratio of permeate flow to concentrate flow without excessive energy consumption.

A manually operated membrane separation apparatus according to the invention separates a feed stream into a permeate stream and a concentrate stream which respectively are permeated and rejected by a semipermeable membrane housed in a membrane vessel. The apparatus is characterized by a reciprocating pump, inlet and outlet conduits and an orifice/relief valve communicating with the membrane to provide essentially uniform pressure and feed fluid flow across the membrane. The reciprocating pump has two cylinders and two movable pistons. While one piston is drawing feed water into its associated cylinder, the other piston is driving the feed stream to the membrane. The pistons cooperate with piston rods which extend to a pump handle.

Each cylinder and piston rod have a relative diameter and length respectively which define the cylinder/piston rod proportions such that ratio of swept length of piston rod and cross sectional area of cylinder determines in conjunction with the pressure relief valve the recovery ratio of permeate stream to total feed stream.

The pump handle is reciprocable and is mechanically connected to the pistons to apply a reciprocating action to the pistons. The inlet conduit communicates with the pumping chambers and with a feed source to admit the feed stream into the pumping chambers, and the outlet conduit communicates with the pumping chambers and with the membrane vessel to carry the pressurized feed stream from the pumping chamber to the feed side of the membrane. The membrane separates the feed stream into the permeate and concentrate streams. The concentrate stream exits the membrane into the concentrate side of the membrane vessel. This concentrate stream is discharged through the orifice/relief valve. The orifice/relief valve, in conjunction with the cylinder/piston rod proportions, ensures that the flow of fluid across the membrane is continuous and not continual to minimize the concentration gradient. Further, the pressure across the membrane is constant maximizing the flow of permeate through the membrane.

A method of membrane separation according to the invention uses an apparatus as generally described above and is characterized as follows. The apparatus consists of a two piston and two cylinder pump configuration that in conjunction with check valving, draws a feed stream into the cylinders and pressurizes the feed stream. While one piston draws the feed stream into the system, the other piston simultaneously pressurizes the feed stream. The pressurized feed stream is fed to the feed side of a membrane vessel which conducts the feed stream to a membrane that separates the feed fluid into permeate and concentrate streams. The two piston, two cylinder system allows an operator to manually operate the unit. The two pistons and piston rods are sized so that the force exerted by the operator on the pistons to pressurize the fluid is minimized while at the same time pistons are sized to move the correct volume of the feed stream through the system.

BRIEF DESCRIPTION OF THE FIGURE

The FIGURE is a schematic illustration of the invention.

DESCRIPTION OF THE PREFERRED EMBODIMENTS(S)

Figure 1:
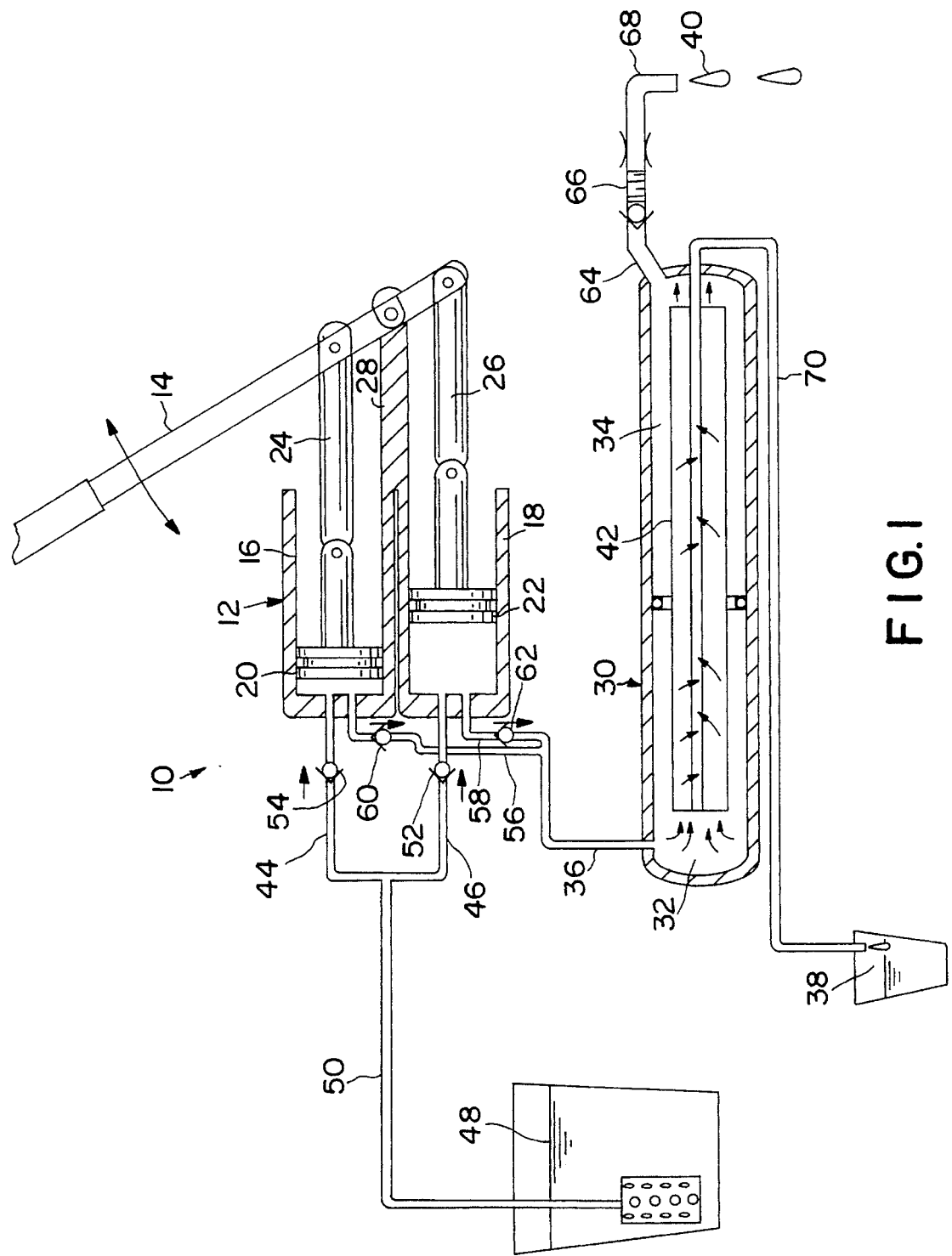

Referring to the drawing, an embodiment of the invention is shown generally at 10 and comprises a reciprocating pump 12 and an drive arm 14 mechanically connected to the pump 12. The reciprocating pump 12 has two pump cylinders 16, 18 and two movable pistons 20, 22 received thereon. The pistons 20, 22 cooperate with piston rods 24, 26 which are pinned to the pump arm 14.

The pump 12 further comprises a support wall 28. The pump arm 14 is rotatably pinned to the upper portion of the wall as shown, which wall functions as a fulcrum for the movement of the piston rods 24, 26.

The cylinders 16, 18, the pistons 20, 22 and the piston rods 24, 26 have relative diameters and lengths which define piston rod/cylinder proportions such that a ratio of the swept length of piston rods to the cross sectional area of the cylinders in conjunction with the relief valve/orifice size 66 determines the recovery ratio of the permeate stream to the total feed stream. More specifically, the two piston diameters are also sized so that the force exerted by the operator on the pump lever arm actuator 14 is minimized, e.g. 12–15 lbf.

A membrane unit 30 is divided into two chambers, a feed zone 32 and a concentrate zone 34. The feed stream flows through the conduit 36 and is separated into a permeate fraction 38 and a concentrate fraction 40 which are respectively permeated and rejected by a membrane 42.

Inlet conduits 44, 46 communicate between the cylinders 16, 18 and a source 48 via a conduit 50 immersed in the source 48. Non-return check valves 52, 54 admit the feed stream into the cylinders 16, 18 preventing return flow. Outlet conduits 56, 58 provide fluid flow communication between the cylinders 16, 18 and the feed zone 32 of the membrane unit 30. Non-return check valves 60, 62 admit the pressurized feed stream into the feed zone 32 of the membrane unit 30 whilst preventing return flow. The feed stream is separated into the permeate fraction 38 and the concentrate fraction 40. The concentrate fraction flows into the concentrate zone 34 of the membrane unit 30. A conduit 64 provides for the flow of the concentrate fraction from the zone 34 to a relief valve/orifice 66. A conduit 68 discharges the concentrate fraction to atmosphere. A conduit 66 conducts the permeate fraction 38 to the user.

The operation of the invention will be described in reference to the following non-limiting illustrative embodiment. The membrane is designed to operate at its optimum at a pressure of 525–575 psig. The designed throughput of the membrane is 100 gallons/day. At 100 gallons/day total throughput, the membrane will yield 10 gallons/day permeate fraction, i.e. ratio of feed stream to permeate fraction. Therefore, 100 gallons/day of water at a pressure of 525–575 psig should be supplied to the membrane by the pumping mechanism. To achieve the correct operating pressure, the pressure relief valve is set to relieve at 550 psig. The maximum reasonable amount of strokes/minute achieved by a human being has been found to be about 40 while exerting a force of 15 lbs. The cross sectional area of the cylinder and the stroke length (ratio of swept length of piston rod and cross sectional area of cylinder) is determined is as follows. (100 gallons/day)/(1440 minutes/day)=0.069 gallons/minute (0.069 gallons/minute)(40 strokes/minute)=0.001736 gallons/stroke (0.001736 gallons/stroke)*(231 in$^3$/gallon)=0.40 in$^3$/stroke (0.401 in$^3$/stroke)/(2 cylinders)=0.200 in$^3$/stroke/cylinder Arbitrarily choosing 0.500 in. diameter as cylinder bore because it is common bore:

Each cylinder:

$$\text{Volume}=(\eta D^2/4)*(\text{Stroke}) \text{ and Stroke}=0.200 \ in^3/(\eta(0.500 \ in)^2/4)= 1.02 \ in.$$

Arbitrarily choosing 1.13 in. stroke to reduce strokes/minutes required to 37.

The force required by a person to achieve the required pressure with this cylinder diameter based arbitrarily on a 12 inch lever arm is determined:

$$F=PA \ F=(550 \ lbf/in^2)*(\eta*(0.500 \ in)^2/4)=108 \ lbf.$$

$$(12 \ in.)*(F)=(1 \ in)*(108 \ lbf.) \ F=9 \ lbf.$$

The two pistons 20, 22 each have a surface diameter of 0.5 in. and a displacement of 0.200 in$^3$ in the cylinders 16, 18 respectively. The membrane 30 designed for the desalinization of water operates in a pressure range of between 525 to 575 psig. Referring to the drawing when the handle 14 is moved left to right, as viewed, the piston 20 moves left to right drawing fluid into the chamber 16. Specifically, fluid is drawn from the source 24 through the conduit 50, the conduit 44, the check valve 54 and into the chamber 16. The piston 22 moves right to left displacing the fluid that is in the cylinder 18. Fluid is discharged from the cylinder 18 through the conduit 58 through the check valve 62 and into the membrane assembly 30, and more particularly the zone 32.

The total displacement of fluid from the cylinder 18 and into the zone 32 is 0.200 in$^3$ ounces of fluid at a pressure of between 525 to 575. When the piston 22 has completed its travel in the cylinder 18, the direction of movement of the handle 14 is reversed resulting in fluid being drawn into the chamber 18 and expelled from the chamber 16. As a practical matter, the reciprocating action of the handle is controlled such that there is a continuous flow of feed stream into the zone 32.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A manually operated apparatus for the desalinization of a feed stream which comprises:

a pump having at least two cylinders and two associated pistons received in the cylinders, the pistons each including a piston rod;

the cylinders disposed in side by side relationship, a pump arm pinned to a support wall which functions as a fulcrum, the support wall positioned between the cylinders, a handle connected to the piston rods to drive the pistons into and out of their associated cylinders in reciprocating opposite fashion such that when one piston is being withdrawn from its cylinder the other piston is introduced into its cylinder;

a source of feed stream to be purified in fluid flow communication with each of the cylinders including first and second feed conduits to provide for the flow of the feed stream from the source to the first and second cylinders respectively, each of the conduits having a check valve therein to prevent back flow of the feed stream from the chamber with which the conduit is associated back to the source, such that as the feed stream is being drawn into one first cylinder from the source of supply the feed stream in the other cylinder is being driven under pressure to a membrane assembly and is prevented from returning to the source;

first and second discharge conduits to provide for fluid flow communication between the first and second cylinders and the membrane assembly, each of said conduits having a check valve therein;

the membrane assembly in fluid flow communication with the first and second cylinders the assembly comprising a membrane having a feed side and a permeate side whereby the feed stream is separated into a permeate fraction and a concentrate fraction, a first conduit secured to the membrane assembly to discharge the concentrate fraction from the membrane assembly, the first conduit having a pressure relief valve therein and a second conduit to discharge the permeate fraction;

the dimensioning of the cylinders, pistons and piston rods, membrane assembly and associated relief valve configured such that the pressure and flow rate of the saline solution flowing into the membrane assembly ensures that the membrane surface on the feed side of the membrane assembly is continuously swept at constant pressure and flow rate to prevent or inhibit concentration polarization.

2. The apparatus of claim 1 wherein the cylinders, pistons and piston rods are dimensioned such that a force of about 15 lbf. applied to the handle will result in a pressure of between 525 to 575 psig in the feed zone of the membrane.

3. The apparatus of claim 2 wherein the membrane unit is configured such that the ratio of the permeate fraction recovered to the feed stream is about 1:10.

* * * * *